US009900847B2

(12) United States Patent
Yeo et al.

(10) Patent No.: US 9,900,847 B2
(45) Date of Patent: Feb. 20, 2018

(54) HEADEND DEVICE OF DISTRIBUTED ANTENNA SYSTEM AND SIGNAL PROCESSING METHOD THEREOF

(71) Applicant: SOLID, INC., Gyeonggi-do (KR)

(72) Inventors: Yeong Shin Yeo, Gyeonggi-do (KR); Bong Cheol Na, Gyeonggi-do (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 14/411,487

(22) PCT Filed: Oct. 15, 2014

(86) PCT No.: PCT/KR2014/009688
§ 371 (c)(1),
(2) Date: Dec. 26, 2014

(87) PCT Pub. No.: WO2016/060294
PCT Pub. Date: Apr. 21, 2016

(65) Prior Publication Data
US 2017/0215153 A1    Jul. 27, 2017

(30) Foreign Application Priority Data

Oct. 14, 2014 (KR) .................. 10-2014-0138465

(51) Int. Cl.
*H04B 1/00* (2006.01)
*H04B 17/00* (2015.01)
*H04B 7/00* (2006.01)
*H04W 52/22* (2009.01)
*H04L 12/26* (2006.01)
*H04B 17/327* (2015.01)
*H04W 52/24* (2009.01)
(Continued)

(52) U.S. Cl.
CPC .... *H04W 52/228* (2013.01); *H04B 10/25753* (2013.01); *H04B 17/327* (2015.01); *H04L 43/18* (2013.01); *H04W 52/245* (2013.01); *H04B 7/04* (2013.01); *H04B 7/2609* (2013.01)

(58) Field of Classification Search
CPC .................................................. H04W 52/228
USPC ........................................................ 455/522
See application file for complete search history.

(56) References Cited

U.S. PATENT DOCUMENTS

2005/0041752 A1* 2/2005 Rosen ................... H04L 27/001
375/268
2010/0311426 A1* 12/2010 Muller .................. H04W 52/40
455/446

(Continued)

OTHER PUBLICATIONS

International Search Report issued in PCT/KR2014/009688 dated Oct. 15, 2014.
Written Opinion issued in PCT/KR2014/009688 dated Jun. 17, 2015.

*Primary Examiner* — Tilahun B Gesesse
(74) *Attorney, Agent, or Firm* — Sughrue Mion, PLLC

(57) ABSTRACT

A headend device includes a spectrum analysis unit configured to analyze a frequency spectrum of a plurality of base station signals to detect characteristic information of the plurality of the base station signals, a control unit configured to generate a control signal to control a power of the plurality of the base station signals on the basis of the characteristic information detected, and a plurality of RF units configured to receive at least one of the plurality of the base station signals and adjust the power of the base station signals received according to the control signal and output the power-adjusted base station signals.

8 Claims, 4 Drawing Sheets

(51) Int. Cl.
  *H04B 10/2575*    (2013.01)
  *H04B 7/04*       (2017.01)
  *H04B 7/26*       (2006.01)

(56) References Cited

U.S. PATENT DOCUMENTS

| | | | | |
|---|---|---|---|---|
| 2011/0044193 A1* | 2/2011 | Forenza | ................ | H04B 7/024 370/252 |
| 2013/0017863 A1* | 1/2013 | Kummetz | ............. | H04W 16/04 455/562.1 |
| 2014/0192849 A1* | 7/2014 | Terry | ................... | H04W 24/02 375/219 |
| 2017/0164323 A1* | 6/2017 | Markhovsky | ....... | H04W 64/006 |

* cited by examiner

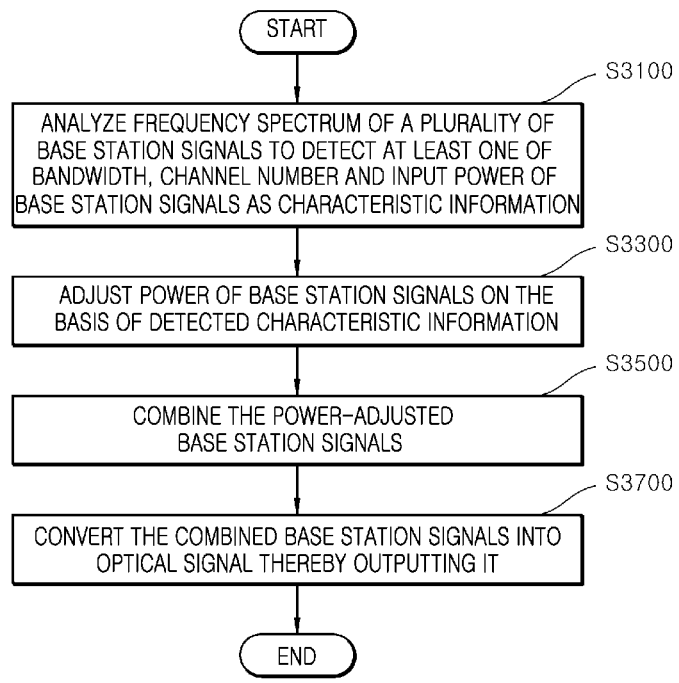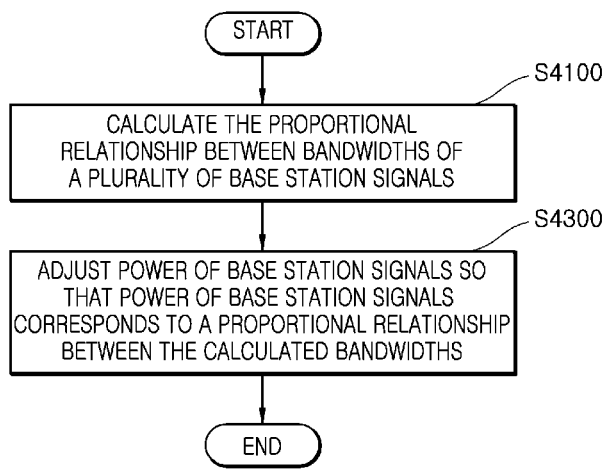

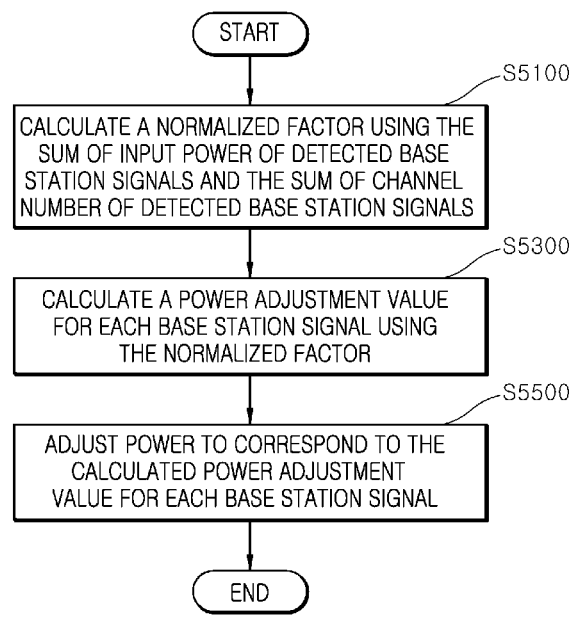

HEADEND DEVICE OF DISTRIBUTED ANTENNA SYSTEM AND SIGNAL PROCESSING METHOD THEREOF

TECHNICAL FIELD

The inventive concept relates to a headend device of a distributed antenna system and a signal processing method thereof, and more particularly, to a headend device of a distributed antenna system which is capable of efficiently managing a limited transmission resource of a distributed antenna system, and a signal processing method thereof.

BACKGROUND ART

In general, with development of mobile communication, use patterns of and demands for a communication device of users have been diversified. Users wish to perform communication without time and space restriction. However, an output from a base station is restricted, and thus, a shadow area may exist due to the location of a base station or the topography of an area. In order to eliminate the shadow area, a distributed antenna system is used.

The distributed antenna system includes a headend device coupled to the base station and a remote device coupled to the headend device through an optical cable. The distributed antenna system is installed in an area in which a radio wave is not received or is weak, such as the inside of a building, the basement of a building, a subway, a tunnel or an apartment complex of a residential area. The distributed antenna system is used to extend the coverage of a base station such that a service is provided to a shadow area which a signal of a base station is unlikely to reach.

For example, in the case of the downlink among the services provided by the distributed antenna system, the headend device serves to combine signals received from the base station and then convert the signals into an optical signal thereby transmitting it to the remote device, and the remote device restores the received optical signal to the original signal and amplifies the restored signal thereby transmitting it to a terminal.

At this time, the higher the signal-to-noise ratio (SNR) of an optical signal transmitted to the remote device from the headend device, the more the quality of the service is improved. However, since there is a limit in increasing the power of a signal to improve the signal-to-noise ratio to increase the power of the signal, the power level of the signal, that is, the transmission resource is limited. For that reason, in the case where various base station signals are combined to be transmitted as an optical signal, there is a problem that the distributed antenna system for providing a multi-band service should distribute appropriately the transmission resource for each of the base station signals so that the base station signals each are transmitted with an optimized power.

In a conventional distributed antenna system, a technician directly analyzes, by using a measuring instrument in the field, signals inputted to the distributed antenna system, and then distributes the limited transmission resource in a manner of controlling attenuation for each signal. However, according to the conventional art, since the technician in the field often performs the repeated optimization of the transmission resource distribution of the distributed antenna system according to his ability, there is a problem that a lot of manpower and time is required.

An object of a headend device of a distributed antenna system and a signal processing method thereof according to the technical features of the inventive concept is to efficiently optimize and thereby distribute a transmission resource of a distributed antenna system for each of signals, and aim at the convenience of an administrator.

SUMMARY

According to an aspect of the inventive concept, a headend device includes a spectrum analysis unit configured to analyze a frequency spectrum of a plurality of base station signals and detect characteristic information of the plurality of the base station signals, a control unit configured to generate a control signal to control the power of the plurality of base station signals on the basis of the characteristic information detected, and a plurality of RF units configured to receive at least one of the plurality of the base station signals, adjust the power of the base station signals received according to the control signal and output the power-adjusted base station signals.

According to an embodiment of the inventive concept, the characteristic information may include the bandwidth information of the plurality of the base station signals, and the control unit may be configured to generate the control signal on the basis of the bandwidth information of the plurality of the base station signals.

According to another embodiment of the inventive concept, the control unit may be configured to calculate the proportional relationship between the bandwidths of the plurality of the base station signals, and generate the control signal so that the power of the plurality of the base station signals corresponds to the proportional relationship between the bandwidths calculated.

According to still another embodiment, the control signal may be a signal for controlling the power of different base station signals to correspond to a power level of the base station signal with the lowest bandwidth among the plurality of the base station signals.

According to yet another embodiment of the inventive concept, the characteristic information may include input power information and channel number information of the plurality of the base station signals, and the control unit may be configured to generate the control signal for controlling the power of the plurality of the base station signals on the basis of the input power information and the channel number information of the plurality of base station signals.

According to still yet another embodiment of the inventive concept, the control unit may be configured to calculate a normalized factor using the sum of the input power of each of the plurality of base station signals and the sum of the number of the channels of each of the plurality of the base station signals, calculate a power adjustment value for each of the plurality of the base station signals by using the normalized factor, and generate the control signal for controlling the power of the plurality of the base station signals to correspond to the power adjustment value.

According to a further embodiment of the inventive concept, the plurality of RF units may include an attenuator for adjusting the power of the received base station signals according to the control signal.

According to another further embodiment of the inventive concept, the headend device may further include a combining/distribution unit configured to receive and combine the power-controlled base station signals outputted from the plurality of the RF units, and at least one optical unit configured to receive the combined base station signals outputted from the combining/distribution unit and convert the combined base station signals into an optical signal to thereby output the optical signal.

According to another aspect of the inventive concept, a signal processing method of a headend device in a distributed antenna system including the headend device and at least one remote device which is operatively coupled to the headend device, the method comprising the steps of: analyzing a frequency spectrum of a plurality of base station signals to detect characteristic information on the plurality of the base station signals; adjusting a power of the plurality of the base station signals based on the characteristic information detected; combining the power-adjusted base station signals; and converting the combined base station signals into an optical signal to thereby output the optical signal.

According to an embodiment of the inventive concept, the step of detecting the characteristic information of the plurality of the base station signals may include detecting at least one of bandwidth, channel number and input power of the plurality of the base station signals as the characteristic information.

According to another embodiment of the inventive concept, the step of adjusting the power of the base station signals may include calculating the proportional relationship between the bandwidths of the plurality of the base station signals and adjusting the power of the plurality of base station signals so that the power of the plurality of the base station signals corresponds to the proportional relationship between the calculated bandwidths.

According to still another embodiment of the inventive concept, the step of controlling the power of the plurality of the base station signals may adjust the power of the different base station signals to correspond to a power level of the base station signal with a minimum bandwidth among the plurality of the base station signals.

According to yet another embodiment of the inventive concept, the step of controlling the power of the plurality of the base station signals may include calculating a normalized factor by using the sum of the input power of each of the plurality of the base station signals and the sum of the number of channels of each of the plurality of the base station signals; calculating a power adjustment value for each of the plurality of the base station signals using the normalized factor; and adjusting the power of the plurality of the base station signals to correspond to the power adjustment value.

According to the headend device of the distributed antenna system and the signal processing method thereof according to the inventive concept, it can evenly distribute the limited transmission resources effectively for each of the base station signals by controlling the power of the base station signals according to the characteristic of the base station signals without the intervention of an administrator and it can aim at the convenience of the administrator.

BRIEF DESCRIPTION OF THE DRAWINGS

Exemplary embodiments of the inventive concept will be more clearly understood from the following detailed description taken in conjunction with the accompanying drawings in which:

FIG. 3 is a flow chart illustrating a signal processing method of a headend device according to an embodiment of the inventive concept.

FIG. 4 is a flow chart illustrating an embodiment of the steps of controlling the power of the base station signals shown in FIG. 3.

FIG. 5 is a flow chart illustrating another embodiment of the steps of controlling the power of the base station signals shown in FIG. 3.

DETAILED DESCRIPTION OF THE EMBODIMENTS

Figure 1:
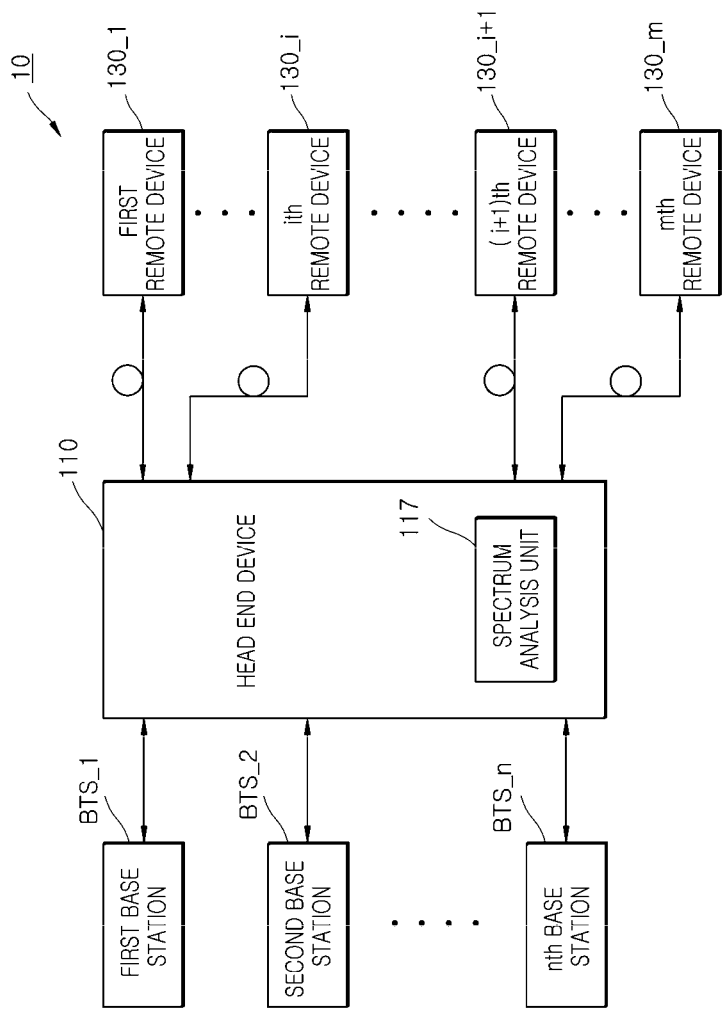
FIG. 1 is a schematic block diagram showing a distributed antenna system according to an embodiment of the inventive concept.

The inventive concept may be made with various changes and embodied in different forms, but, specific embodiments of the inventive concept will be described below in detail with reference to the accompanying drawing. However, this is not intended to limit the inventive concept to certain embodiments, but it should be understood as including all modifications, equivalents and substitutes included in the spirit and scope of the invention.

In the following descriptions of the inventive concept, if detailed descriptions of well-known technology that is determined to unnecessarily obscure the subject matter of the inventive concept, the detailed descriptions thereof will be omitted. Further, the numbers (e.g., the first, second, etc.) used in the course of being described in the specification are used just to distinguish one component from the other components.

Further, in this specification, when referred to as one component "is connected to" or "is accessed to" the other component, it may be understood as meaning that the one component is connected directly to the other components, but, as long as any particular descriptions to the contrary are not made, it should be understood that the one component may be connected or accessed to the other component via another component in the middle thereof.

Further, the terms of "-unit", "-tor", "-device", "-module", etc. described in the present specification refer to a unit that processes at least one function or operation, which may be implemented with hardware or software or in a combination of hardware and software And, in the descriptions, it will be appreciated by one skilled in the art that components in the configuration are distinguished from one another just on the basis of the main functions each component is in charge. That is, two or more components in the configurations to be described below may be integrated into one component, or one component in the configuration may be divided into two or more components according to each function separated in more detail. And, each of the components to be described below may additionally perform any or all of the functions other components are in charge in addition to the main functions each one is in charge, and, any of the main functions each of the components is in charge may be dedicated and performed by other components.

The distributed antenna system according to one embodiment of the inventive concept is a coverage system for an in-building service that transfers voice communications and data communications with high quality and seamless access. In addition, it is a system for servicing analog and digital phone systems, which provide a service within a plurality of bands, in a single antenna.

The distributed antenna system according to an embodiment of the inventive concept may be provided mainly in general public and private facilities such as shopping malls, hotels, campuses, airports, hospitals, subways, stadiums, convention centers, etc.

The distributed antenna system according to an embodiment of the inventive concept may improve poor radio-wave environment in a building, improve poor received signal strength indication (RSSI) and overall received sensitivity Ec/Io (chip energy/others interference) of a mobile terminal, and service the mobile communications even in a corner of the building thereby enabling a communication service user to freely make a call at any place in the building.

The distributed antenna system according to one embodiment of the inventive concept can support a mobile communication standard used all over the world. For example, the distributed antenna system may support a very high frequency (VHF), an ultra high frequency (UHF), frequencies such as 700 MHz, 800 MHz, 850 MHz, 900 MHz, 1900 MHz, 2100 MHz band, 2600 MHz band, etc. and a service of TDD mode as well as a service of FDD mode. Further, the distributed antenna system may support a large number of mobile communication standards, for example, an Advanced Mobile Phone Service (AMPS) as a typical mobile communication service of an analog and a time division multiple access (Time-Division Multiplexing Access, TDMA) as a digital, a code division multiple access (CDMA), an asynchronous CDMA (Wideband Code Division Multiple Access, WCDMA), a high speed downlink packet access (HSDPA), a long-term evolution (LTE), a long-term evolution advanced (LTE-A), etc.

Hereinafter, preferred embodiments of the inventive concept will be described in detail.

FIG. 1 is a schematic block diagram showing a distributed antenna system according to an embodiment of the inventive concept.

Referring to FIG. 1, the distributed antenna system 10 may include a headend device 110 and first to mth remote devices 130_1 to 130_m (wherein m is natural number greater than 1).

The headend device 110 may be coupled to the first to nth base stations BTS_1 to BTS_n (wherein n is natural number greater than 1) through a predetermined transmission medium, for example, such as a coaxial cable and the like. In another embodiment, the headend device 110 may be coupled to the first to nth base stations BTS_1 to BTS_n by wireless.

The headend device 110 may receive the base station signals from the first to nth base stations BTS_1 to BTS_n. Here, the first to nth base stations BTS_1 to BTS_n may provide the base station signal of RF type to headend device 110, but the technical feature of the inventive concept is not limited thereto. In yet another embodiment, at least a portion of the first to nth base stations BTS_1 to BTS_n may provide the base station signal of a digital type to the headend device 110, in this case, the headend device 110 may be provided with an interface unit for converting the base station signal of a digital type into the base station signal of RF type. The base station signals each may have a specific frequency band according to the services provided by the corresponding base station among the first to nth base stations BTS_1 to BTS_n.

The headend device 110 may have a spectrum analysis unit 117. The spectrum analysis unit 117 may analyze the frequency spectrum of the base station signals to detect the characteristic information for each of the base station signals. The characteristic information may include, for example, the bandwidth information, the channel number information, and the input power of the base station signals.

The headend device 110 may adjust the power of each of the base station signals based on the characteristic information detected by the spectrum analysis unit 117. The headend device 110 may combine the power-controlled base station signals and convert the combined base station signals into an optical signal. A detailed configuration and a method for a signal processing such as a power control of the base station signals of the headend device 110 will be described in further detail below with reference to FIGS. 2 to 5.

The headend device 110 may be coupled to the first to mth remote devices 130_1 to 130_m through a transmission medium, for example, the optical cable. The headend device 110 may transmit the optical signal to each of the first to mth remote devices 130_1 to 130_m through a corresponding transmission medium. In another embodiment, the headend device 110 may be coupled to an expansion device (not shown) through a transmission medium, for example, an optical cable and may transmit the optical signal to the expansion unit through the transmission medium. The expansion device may transmit the optical signal received from the headend device 110 to a portion of the remote devices coupled through the expansion device and the transmission medium, for example, the optical cable.

The first to mth remote devices 130_1 to 130_m may restore the received optical signal into the original base station signals and amplify the restored base station signals thereby emitting it through an antenna (not shown). The first to mth remote devices 130_1 to 130_m may be connected with an optical unit (see "115" of FIG. 2) of the headend device 110 for each group, and receive the optical signal from the optical unit corresponding to each group. For example, the first to ith remote devices 130_1 to 130_i, (wherein i is natural number greater than 1 and less than m) and the (i+1)th to mth remote devices 130_i+1 to 130_m may be connected to each of the different optical units, and receive the optical signal from the corresponding optical units, respectively.

As such, in the distributed antenna system 110, the headend device 110 directly controls the power of the base station signals based on the characteristic of each of the plurality of the base station signals, combines the power-controlled base station signals and then converts the combined signals into an optical signal thereby transmitting it to the first to mth remote devices 130_1 to 130_m.

Thus, the distributed antenna system 110 may allow the limited transmission resource of the headend device 110 to be evenly distributed even without intervention of an administrator according to the characteristic of each of the plurality of the base station signals, the efficient distribution of the transmission resource and the convenience of the manager can be achieved.

Figure 2:
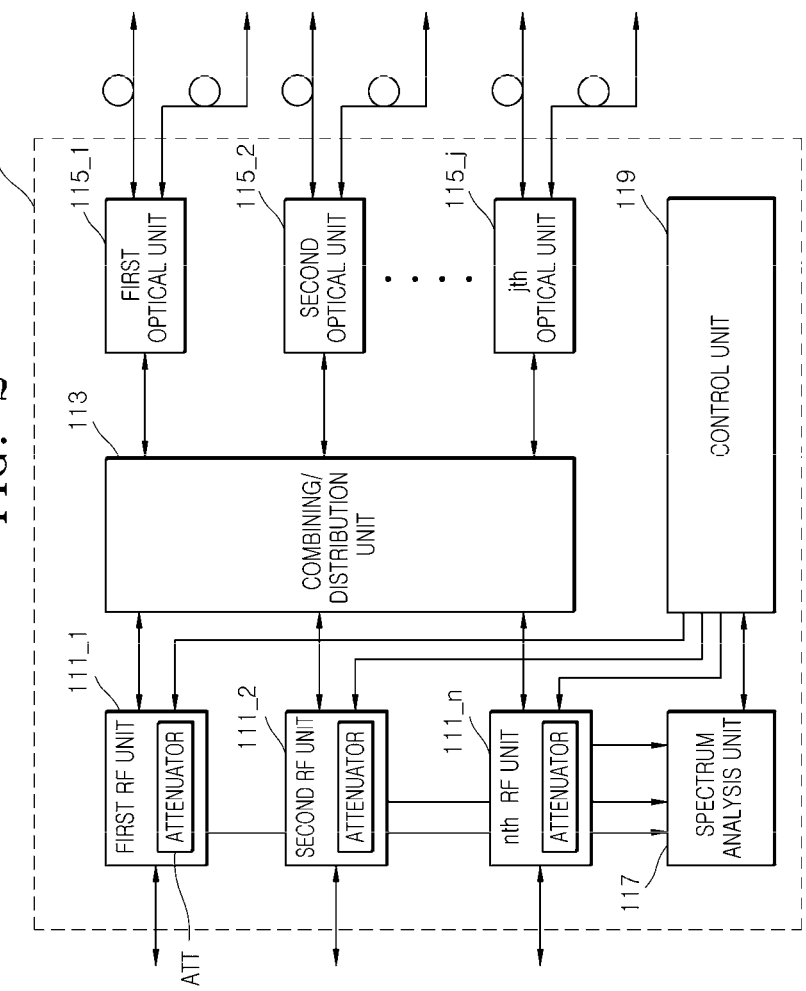
FIG. 2 is a schematic block diagram showing a portion of the configuration of a headend device according to an embodiment of the inventive concept.

FIG. 2 is a schematic block diagram showing a partial configuration of the headend device an embodiment of the inventive concept. In the description of FIG. 2, it will be described with reference to FIG. 1, but descriptions overlapped the descriptions of FIG. 1 will be omitted for convenience.

Referring to FIGS. 1 and 2, the headend device 110 may include the first to nth RF units 111_1 to 111_n, the combining/distribution unit 113, the first to j-th optical units 115_1 to 115_j, the spectrum analysis unit 117 and the control unit 119.

The first to nth RF units 111_1 to 111_n each may receive the base station signal from the corresponding base station among the first to nth base stations BTS_1 to BTS_n. However, this is not limited to this embodiment, and in another embodiment, at least two or more RF units of the first to nth RF units 111_1 to 111_*n* may receive the base station signal from any one of the first to nth base stations BTS_1 to BTS_*n*.

The first to nth RF units 111_1 to 111_*n* may be provided with an attenuator (ATT) to adjust the power of the base station signal. The attenuator (ATT) may adjust the power of the base station signal in response to a control signal supplied from the control unit 119.

The combining/distribution unit 113 may combine the power-adjusted base station signals outputted from the first to nth RF units 111_1 to 111_*n*. The combining/distribution unit 113 can distribute the combined base station signals to the first to j-th optical units 115_1 to 115_*j*.

The first to j-th optical units 115_1 to 115_*j* may convert the combined base station signals output from the combining/distribution unit 113 into an optical signal to thereby output the optical signal. That is, the first to j-th optical units 115_1 to 115_*j* may transmit the optical signal through a corresponding transmission medium to the remote device.

The spectrum analysis unit 117 may receive the base station signal from the plurality of the base stations and analyze the frequency spectrum of the received base station signals to detect the characteristic information.

In some embodiments, the spectrum analysis unit 117 is coupled to an input terminal of each of the first to nth RF units 111_1 to 111_*n* connected to the corresponding base station of the first to nth base stations (BTS_1 to BTS_*n*) thereby receiving the base station signals inputted to the first to nth RF units 111_1 to 111_*n* and analyzing the frequency spectrum of the received base station signals to detect the characteristic information.

However, the inventive concept is not limited to this embodiment. In another embodiment, the spectrum analysis unit 117 is coupled to an output terminal of each of the first to nth RF units 111_1 to 111_*n* connected to the combining/distribution unit 113 thereby receiving the base station signals outputted from the first to nth RF units 111_1 to 111_*n* and analyzing the frequency spectrum of the received base station signals. In this case, the spectrum analysis unit 117 may analyze the frequency spectrum of the base station signals outputted from the first to nth RF units 111_1 to 111_*n*, on the basis of the information on the base station signal processing of the RF unit, which is provided from the control unit 119, for example, the information on the power control result and the like, thereby detecting the characteristic information.

In yet another embodiment, the spectrum analysis unit 117 may receive the base station signals directly from the first to nth base stations BTS_1 to BTS_*n* without being coupled to the first to nth RF units 111_1 to 111_*n*, or through an additional interface means, and analyze the frequency spectrum of the received base station signals to detect the characteristic information.

The control unit 119 may generate a control signal for controlling the power of the base station signals based on the characteristic information of the base station signals detected by the spectrum analysis unit 117.

In some embodiments, the control unit 119 may generate a control signal for controlling the power of the base station signals based on the bandwidth information of the base station signals out of the detected characteristic information. Specifically, the control unit 119 may calculate a proportional relationship between the bandwidths of the detected base station signals, and generate the control signal so that the power of the base station signals corresponds to the proportional relationship between the calculated bandwidths. Herein, the control signal may be a signal for controlling the power level of another signal to correspond to the power level of the base station signal with the lowest bandwidth.

The case where the plurality of base station signals includes GSM signal, CDMA signal, WCDMA signal and LTE 10M signal will be further described as an example. The GSM signal has a bandwidth of approximately 200 kHz, the CDMA signal approximately 1.23 MHz, the WCDMA signal approximately 3.84 MHz, the LTE 10M signal approximately 9 MHz, respectively. The control unit 119 calculates a proportional relationship between the bandwidths of the base station signals as 1:6:20:45 (GSM signal: CDMA signal:WCDMA signal:LTE 10M signal), and generates a control signal for controlling the power levels of different base station signals as a power level of the GSM signal having the lowest value, i.e., the minimum bandwidth, of the proportional relationship so that the power of the base station signals correspond to the proportional relationship between the calculated bandwidths.

The above-described embodiment is applied not only to the case the base station signals having a single channel, but also to the case the base station signals having a predetermined number of channels. For example, in the case of the base station signals having a predetermined number of channels, the above-described embodiment may be applied on the basis of a unit bandwidth of each of the base station signals (that is, a bandwidth of a single channel).

In another embodiment, the control unit 119 may generate a control signal for controlling the power of the base station signals on the basis of the input power information and channel number information of the base station signals out of the detected characteristic information. In detail, the control unit 119 may calculate the normalized factor by using the sum of the input power of each of the base station signals and the sum of the channel number of each of the base station signals, calculate the power adjustment value for each of the plurality of the base station signals using the normalized factor calculated, and generate the control signal for controlling the power of the base station signals so as to correspond to the calculated power adjustment value. Here, the normalized factor may mean a value obtained by dividing the sum of the input power of each of the base station signals by the sum of the channel number of each of the base station signals, and the power adjustment value may mean a value obtained by multiplying the input power of each of the base station signals by the normalized factor.

On the other hand, when the control unit 119 generates the control signal for controlling the power of the base station signals, it may use the characteristic information already stored or the characteristic information inputted in real time by an administrator, for a portion of the base station signals. For example, when the bandwidths of a portion of the base station signals are mutually similar or at least a portion of the bandwidths is overlapped, the control signal may be generated by using the characteristic information associated with the bandwidths of the corresponding base station signals stored in advance or inputted in real time by an administrator.

The control unit 119 may transmit the generated control signal to the first to nth RF units 111_1 to 111_*n*, and thus the attenuator (ATT) of the first to nth RF units 111_1 to 111_*n* may adjust and output the power of the base station signals.

In this way, the headend device 110 controls the power of the base station signals according to the characteristic of the base station signals without the intervention of an administrator, then combines the base station signals into one signal, and photo-converts the combined signals thereby transmitting it to the remote device. Accordingly, the headend device 110 can evenly and effectively distribute the transmission resources limited due to the limit of the signal-to-noise ratio (SNR) of the optical signals to each of the base station signals, thereby aiming at the convenience of an administrator.

FIG. 3 is a flowchart illustrating a signal processing method of the headend device according to an embodiment of the technical features of the inventive concept, FIG. 4 is a flowchart illustrating an embodiment of a step of controlling the power of the base station signals shown in FIG. 3, and FIG. 5 is a flowchart illustrating another embodiment of controlling the power of the base station signals shown in FIG. 3. The methods shown in FIGS. 3 to 5 are composed of the steps of being processed in time series in the headend device 110 shown in FIGS. 1 and 2. Accordingly, even though it is omitted below, the descriptions described in the foregoing with respect to the headend device 110 shown in FIGS. 1 and 2 may be applied even to the methods illustrated in FIGS. 3 to 5.

Referring first to FIG. 3, in step S3100, the spectrum analysis unit 117 may detect the characteristic information of the plurality of the base station signals by analyzing the frequency spectrum of the plurality of the base station signals. The spectrum analysis unit 117 may detect, as the characteristic information, at least one of the bandwidth, the channel number and the input power of the plurality of base station signals.

In step S3300, the control unit 119 and the first to nth RF units 111_1 to 111_*n* may control the power of the plurality of base station signals on the basis of the characteristic information detected by the spectrum analysis unit (117). In detail, the control unit 119 may generate the control signal for controlling the power of the plurality of the base station signals on the basis of the characteristic information detected, and the first to nth RF units 111_1 to 111_*n* may control and output the power of the corresponding base station signal out of the plurality of the base station signals in response to the control signal.

Referring to FIG. 4 illustrating an embodiment of step S3300, in step 4100, the control unit 119 may calculate the proportional relationship between the bandwidths of the plurality of the base station signals.

In step 4300, the control unit 119 and the first to nth RF units 111_1 to 111_*n* may adjust the power of the plurality of the base station signals so that the power of the plurality of the base station signals corresponds to the proportional relationship between the calculated bandwidths. Specifically, the control unit 119 may generate the control signal for controlling the power of the plurality of the base station signals so that the power of the plurality of the base station signals corresponds to the proportional relationship between the calculated bandwidths, and the first to nth RF units 111_1 to 111_*n* may adjust and output the power of the corresponding base station signal out of the plurality of the base station signals in response to the control signal. Herein, the control signal may be a signal for controlling the power of the different base station signals so as to correspond to the power level of the base station signal having a minimum bandwidth out of the plurality of the base station signals.

Referring to FIG. 5 showing another embodiment of step S3300, in step S5100, the control unit 119 may calculate the normalized factor by using the sum of the input power of each of the plurality of the base station signals and the sum of the channel number of each of the plurality of base station signals. The normalized factor is a value obtained by dividing the sum of the input power of each of the plurality of the base station signals by the sum of the channel number of each of the plurality of the base station signals.

In step S5300, the control unit 119 may calculate the power adjustment value for each of the plurality of the base station signals using the normalized factor. The power adjustment value means a value obtained by multiplying the input power of each of the plurality of the base station signals by the normalization factor.

In step S5500, the control unit 119 and the first to nth RF units 111_1 to 111_*n* may adjust the power of the plurality of the base station signals so as to correspond to the power adjustment value. Specifically, the control unit 119 may generate the control signal for controlling the power of the plurality of base station signals so as to correspond to the power adjustment value, and the first to nth RF units 111_1 to 111_*n* may control and output the power of the corresponding base station signal out of the plurality of the base station signals in response to the control signal.

Referring again to FIG. 3, in S3500, the combining/distribution unit 113 may combine the power-adjusted base station signals outputted from the first to nth RF units 111_1 to 111_*n*.

In step S3700, the first to j-th optical units 115_1 to 115_*j* may receive the combined base station signals from the combining/distribution unit 113, and convert the received base station signals into an optical signal to output it.

While the inventive concept has been described with respect to the preferred embodiments, it will be apparent to those skilled in the art that various changes and modifications may be made without departing from the spirit and scope of the invention as defined in the following claims.

What is claimed is:

1. A headend device of a distributed antenna system, the headend device comprising at least one processor to implement:
   a spectrum analysis unit configured to analyze a frequency spectrum of a plurality of base station signals to detect at least one characteristic of the plurality of base station signals;
   a control unit configured to generate a control signal for controlling power levels of the plurality of base station signals based on the detected characteristic; and
   a plurality of RF units, each of the plurality of RF units being configured to receive at least one of the plurality of base station signals, generate a power-adjusted base station signal by adjusting a power level of the received base station signal based on the control signal, and output the power-adjusted base station signal,
   wherein the at least one characteristic comprises bandwidths of the plurality of base station signals, and
   wherein the control unit is further configured to calculate a proportional relation between the bandwidths of the plurality of base station signals, and generate the control signal based on the proportional relation.

2. The headend device of claim 1, wherein the control signal is a signal for controlling the power levels of the plurality of base station signals so that power levels of the power-adjusted base station signals correspond to a power level of a base station signal having a minimum bandwidth among the plurality of base station signals according to the proportional relation.

3. The headend device of claim 1, wherein each of the plurality of RF units comprises an attenuator for adjusting the power level of the received base station signal based on the control signal.

4. The headend device of claim 1, further comprising:
a combining/distribution unit configured to receive the power-adjusted base station signals outputted from the plurality of RF units; and
at least one optical unit configured to receive the base station signals outputted from the combining/distribution unit, convert the combined base station signals into an optical signal, and output the optical signal.

5. A signal processing method of a headend device in a distributed antenna system including the headend device and at least one remote device coupled to the headend device, the method comprising:
detecting at least one characteristic of a plurality of base station signals by analyzing a frequency spectrum of the plurality of base station signals;
generating power-adjusted base station signals be adjusting power levels of the plurality of base station signals based on the detected characteristic;
combining the power-adjusted base station signals; and
converting the combined base station signals into an optical signal,
wherein the detecting of the at least one characteristic of the plurality of base station signals comprises detecting bandwidths of the plurality of base station signals as the characteristic, and
wherein the adjusting of the power levels of the plurality of base station signals comprises calculating a proportional relation between the bandwidths of the plurality of base station signals and adjusting the power levels of the plurality of base station signals based on the proportional relation.

6. The signal processing method of claim 5, wherein the generating of the power-adjusted base station signals comprises adjusting the power levels of the plurality of base station signals so that power levels of the power-adjusted base station signals correspond to a power level of a base station signal having a minimum bandwidth among the plurality of base station signals according to the proportional relation.

7. A headend device of distributed antenna system, the headend device comprising at least one processor to implement:
a spectrum analysis unit configured to analyze a frequency spectrum of a plurality of base station signals to detect at least one characteristic of the plurality of base station signals;
a control unit configured to generate a control signal for controlling power levels of the plurality of base station signals based on the detected characteristic; and
a plurality of RF units, each of the plurality of RF units being configured to receive at least one of the plurality of base station signals, generating a power-adjusted base station signal by adjusting a power level of the received base station signal in response to the control signal, and output the power-adjusted base station signal,
wherein the characteristic comprises input power values and a number of channels of the plurality of base station signals, and
wherein the control unit configured to calculate a normalized factor using a sum of the input power values of the plurality of base station signals and a sum of the number of channels of the plurality of base station signals, calculate power adjustment values for each of the plurality of base station signals using the normalized factor, and generate the control signal for controlling the power levels of the plurality of base station signals to correspond to the power adjustment values.

8. A signal processing method of a headend device in a distributed antenna system including the headend device and at least one remote device coupled to the headend device, the method comprising:
detecting at least one characteristic of a plurality of base station signals by analyzing a frequency spectrum of the plurality of base station signals;
generating power-adjusted base station signals by adjusting power levels of the plurality of base station signals based on the detected characteristic;
combining the power-adjusted base station signals; and
converting the combined base station signals into an optical signal,
wherein the detecting of the at least one characteristic of the plurality of base station signals comprises detecting input power values and a number of channels of the plurality of base station signals as the characteristic;
wherein the adjusting of the power levels of the plurality of base station signals comprises:
calculating a normalized factor by using a sum of the input power values of the plurality of base station signals and a sum of the number of channels of the plurality of base station signals;
calculating power adjustment values for each of the plurality of base station signals using the normalized factor; and
adjusting the power of the plurality of base station signals to correspond to the power adjustment value.

\* \* \* \* \*